(12) United States Patent
Akimoto et al.

(10) Patent No.: US 12,461,080 B2
(45) Date of Patent: Nov. 4, 2025

(54) SENSOR AND SENSOR SYSTEM

(71) Applicant: KABUSHIKI KAISHA TOSHIBA, Tokyo (JP)

(72) Inventors: Yosuke Akimoto, Yokohama Kanagawa (JP); Akira Fujimoto, Kawasaki Kanagawa (JP); Hiroaki Yamazaki, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 265 days.

(21) Appl. No.: 18/174,960

(22) Filed: Feb. 27, 2023

(65) Prior Publication Data
US 2024/0011961 A1    Jan. 11, 2024

(30) Foreign Application Priority Data
Jul. 8, 2022    (JP) .................. 2022-110263

(51) Int. Cl.
G01N 33/00    (2006.01)
(52) U.S. Cl.
CPC ..... *G01N 33/0027* (2013.01); *G01N 33/0011* (2013.01)
(58) Field of Classification Search
CPC ................ G01N 33/0007; G01N 33/0011
See application file for complete search history.

(56) References Cited

U.S. PATENT DOCUMENTS

| 9,709,425 B2* | 7/2017 | Matsui | G01D 11/24 |
| 2005/0072211 A1* | 4/2005 | Weyl | G01N 27/4077 |
| | | | 73/23.2 |
| 2006/0048562 A1* | 3/2006 | Oishi | G01N 33/006 |
| | | | 73/23.2 |

(Continued)

FOREIGN PATENT DOCUMENTS

| JP | 2015-148540 A | 8/2015 |
| JP | 2018-72152 A | 5/2018 |

(Continued)

OTHER PUBLICATIONS

Japan Patent Office, Office Action in JP Patent App. No. 2022-110263 (May 16, 2025).

*Primary Examiner* — Kristina M Deherrera
*Assistant Examiner* — Jean F Morello
(74) *Attorney, Agent, or Firm* — Finnegan, Henderson, Farabow, Garrett & Dunner, LLP

(57) ABSTRACT

According to one embodiment, a sensor includes a housing, a sensor portion, and a film member. The housing includes a first housing member including an opening. The first housing member includes a first inner face, and a first side face inside the opening. The sensor portion includes a sensor member including a hole, and a sensor element. A first gap is provided between the sensor element and the sensor member. The film member is porous. The film member includes an inner region and an outer region around the inner region. The outer region faces the first inner face. The sensor member is located between the sensor element and the inner (Continued)

region. The sensor member faces the inner region. At least a part of the inner region overlaps the first side face in a second direction crossing a first direction from the sensor element to the sensor member.

20 Claims, 3 Drawing Sheets

(56) References Cited

U.S. PATENT DOCUMENTS

| | | | |
|---|---|---|---|
| 2009/0074619 A1* | 3/2009 | Akechi | G01N 33/1846 422/69 |
| 2015/0226688 A1 | 8/2015 | Watanabe et al. | |
| 2018/0120248 A1 | 5/2018 | Akuzawa et al. | |
| 2019/0041353 A1* | 2/2019 | Matsukura | G01N 33/0027 |
| 2020/0209183 A1* | 7/2020 | Jian | G01N 33/0009 |
| 2022/0003730 A1 | 1/2022 | Itoi et al. | |
| 2022/0260538 A1* | 8/2022 | Schaller | G01N 33/005 |

FOREIGN PATENT DOCUMENTS

| | | |
|---|---|---|
| JP | 2021-121910 A | 8/2021 |
| JP | 2022-12738 A | 1/2022 |

\* cited by examiner

SENSOR AND SENSOR SYSTEM

CROSS-REFERENCE TO RELATED APPLICATIONS

This application is based upon and claims the benefit of priority from Japanese Patent Application No. 2022-110263, filed on Jul. 8, 2022; the entire contents of which are incorporated herein by reference.

FIELD

Embodiments of described herein generally relate to a sensor and a sensor system.

BACKGROUND

Improvements in detection accuracy are desired in gas sensors and the like.

DETAILED DESCRIPTION

Figure 1:
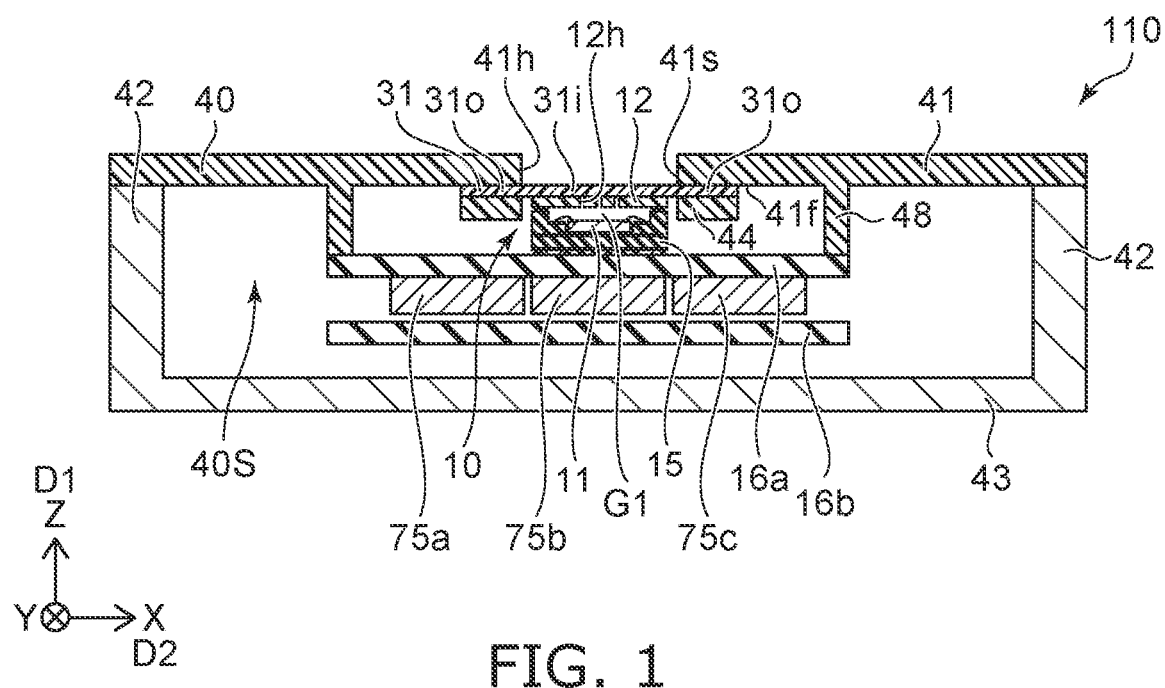
FIG. 1 is a schematic cross-sectional view illustrating a sensor according to a first embodiment.

According to one embodiment, a sensor includes a housing, a sensor portion, and a film member. The housing includes a first housing member including an opening. The first housing member includes a first inner face, and a first side face inside the opening. The sensor portion includes a sensor member including a hole, and a sensor element. A first gap is provided between the sensor element and the sensor member. The film member is porous. The film member includes an inner region and an outer region around the inner region. The outer region faces the first inner face. The sensor member is located between the sensor element and the inner region. The sensor member faces the inner region. At least a part of the inner region overlaps the first side face in a second direction crossing a first direction from the sensor element to the sensor member.

Embodiments of the present invention will now be described with reference to the drawings.

The drawings are schematic or conceptual, and the relationship between the thickness and width of the respective portions, the ratio of the sizes between the portions, and the like are not necessarily the same as the actual ones. Even when the same part is represented, the dimensions and proportions of each other may be represented differently depending on the drawings.

In the specification of the present application and each of the figures, elements similar to those described above with respect to the previously described figures are denoted by the same reference numerals and a detailed description thereof is omitted as appropriate.

First Embodiment

FIG. 1 is a schematic cross-sectional view illustrating a sensor according to the first embodiment.

Figure 2:
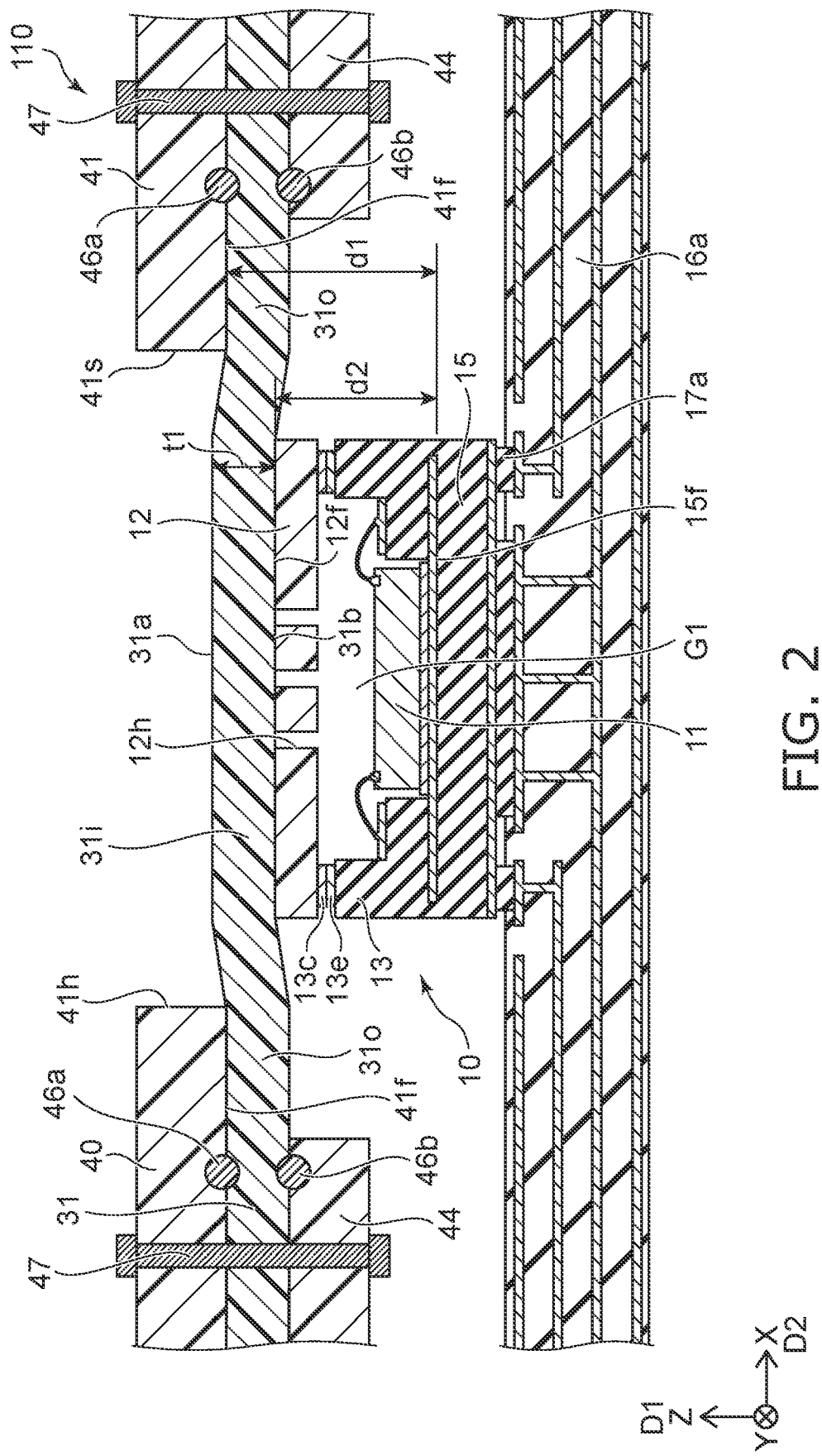
FIG. 2 is a schematic cross-sectional view illustrating a part of the sensor according to the first embodiment.

FIG. 2 is a schematic cross-sectional view illustrating a part of the sensor according to the first embodiment.

FIG. 2 is an enlarged view of a part of FIG. 1. As shown in FIGS. 1 and 2, a sensor 110 according to the embodiment includes a housing 40, a sensor portion 10, and a film member 31.

The housing 40 includes a first housing member 41. The first housing member 41 includes an opening 41h. The first housing member 41 includes a first inner face 41f and a first side face 41s. The first side face 41s is an inner face of the opening 41h. The first side face 41s crosses the first inner face 41f.

The sensor portion 10 includes a sensor element 11 and a sensor member 12. The sensor member 12 includes a hole 12h. The number of holes 12h is arbitrary. A first gap G1 is provided between the sensor element 11 and the sensor member 12. The sensor member 12 is, for example, a lid.

The film member 31 is porous. For example, the film member 31 is flexible. For example, the film member 31 may include a fluorine resin. For example, the film member 31 may include polytetrafluoroethylene.

The film member 31 includes an inner region 31i and an outer region 31o. The outer region 31o is the region around the inner region 31i. The boundaries between these regions may be clear or unclear. The outer region 31o faces the first inner face 41f. For example, the outer region 31o contacts the first inner face 41f. The sensor member 12 is located between the sensor element 11 and the inner region 31i. The sensor member 12 is located between the first gap G1 and the inner region 31i. The sensor member 12 faces the inner region 31i. For example, the sensor member 12 contacts the inner region 31i.

A first direction D1 from the sensor element 11 to the sensor member 12 is defined as a Z-axis direction. A direction perpendicular to the Z-axis direction is defined as an X-axis direction. The direction perpendicular to the Z-axis direction and the X-axis direction is defined as a Y-axis direction.

As shown in FIG. 2, at least a part of the inner region 31i overlaps the first side face 41s in the second direction D2. The second direction D2 is, for example, the X-axis direction. The second direction D2 may be the Y-axis direction. The second direction D2 may be any direction along a plane (X-Y plane) intersecting the Z-axis direction, for example.

For example, a part of the inner region 31i protrudes toward the outside space at the opening 41h. The part of the inner region 31i may face a portion of the first side face 41s. For example, the part of the inner region 31i may contact a part of the first side face 41s.

As shown in FIG. 2, for example, the film member 31 includes a first film face 31a and a second film face 31b. The second film face 31b faces the sensor member 12. The second film face 31b is the inner face. The first film face 31a faces the space outside the opening 41h. The first film face 31a is the outer face. The second film face 31b is between the sensor member 12 and the first film face 31a. At least a part of the first film face 31a is convexly curved. For example, at least a part of the second film face 31b is concave.

For example, the sensor member 12 pushes the film member 31 outward. In this state, the film member 31 is fixed to the first housing member 41. The film member 31 is in close contact with the first housing member 41. The film member 31 is in close contact with the sensor member 12.

The film member 31 may not be adhered to other members. The detection target gas can pass through the film member 31. The film member 31 is substantially impermeable to liquid. The film member 31 suppresses liquid (such as water) from entering the sensor portion 10.

The film member 31 having such properties has low adhesiveness. The film member 31 is fixed mechanically by another member instead of by adhesion. In the embodiment, the film member 31 is fixed while being pushed outward by the sensor member 12. Thereby, the film member 31 can adhere to the first housing member 41 and the sensor member 12. Entering of liquid into the sensor portion 10 from the outside can be suppressed. The sensor portion 10 can stably operate. High detection accuracy can be maintained. According to the embodiment, it is possible to provide a sensor capable of improving detection accuracy.

As shown in FIG. 2, for example, the sensor portion 10 may further include an element board 15. The sensor element 11 is provided between the element board 15 and the sensor member 12. The element board 15 includes an element board face 15f. The element board face 15f faces the sensor element 11. The element board face 15f is the upper face of the element board 15.

The sensor member 12 includes a sensor member face 12f. The sensor member face 12f faces the inner region 31i. For example, the sensor member face 12f is the upper face of the sensor member 12.

The first inner face 41f is the lower face of the first housing member 41. A distance along the first direction D1 between the element board face 15f and the first inner face 41f is defined as a first distance d1. A distance along the first direction D1 between the element board face 15f and the sensor member face 12f is defined as a second distance d2. A thickness along the first direction D1 of the inner region 31i is defined as a first thickness t1. The first distance d1 is shorter than the sum of the second distance d2 and the first thickness t1. Due to this relationship, the inner region 31i protrudes toward the outside space at the opening 41h.

For example, the absolute value of the difference between the first distance d1 and the sum is not less than 0.001 times and not more than 1 time the first thickness t1.

As shown in FIG. 2, the sensor portion 10 may further include a support portion 13. The support portion 13 is fixed to the element board 15. The support portion 13 is located between the element board 15 and the sensor member 12. The support portion 13 supports the sensor member 12. Thereby, a first gap G1 is provided between the sensor element 11 and the sensor member 12.

As shown in FIG. 2, the support portion 13 is provided around the sensor element 11 in a plane crossing the first direction D1 (for example, the X-Y plane). The space (first space) surrounded by the element board 15, the support portion 13, the sensor member 12, and the film member 31 is substantially waterproof.

In the embodiment, the detection target gas can pass through the opening 41h and the hole 12h and reach the first gap G1. The film member 31 can suppress passage of liquid from the opening 41h to the first gap G1. The film member 31 can suppress passage of water (liquid) from the opening 41h to the first gap G1.

As shown in FIG. 1, for example, the housing 40 may include second housing member 42 and third housing member 43. The sensor portion 10 is located between the third housing member 43 and the first housing member 41 in the first direction D1. The second housing member 42 is connected with the first housing member 41 and the third housing member 43. The second housing member 42 is provided around the sensor portion in a plane (for example, the X-Y plane) crossing the first direction D1. A space 40S inside the housing 40 is substantially waterproof.

A space (first space) surrounded by the element board 15, the support portion 13, the sensor member 12, and the film member 31 may be connected to the space 40S inside the housing 40. The space 40S is a portion of the interior of the housing 40 excluding the first space.

As shown in FIGS. 1 and 2, the sensor portion 10 may include a first mounting board 16a. As shown in FIG. 2, the element board 15 is fixed to the first mounting board 16a. The first mounting board 16a may include various wiring layers. The wiring included in the element board 15 may be electrically connected to the wiring layer included in the first mounting board 16a by a connecting member 17a (for example, solder). The first mounting board 16a is, for example, a sensor board. In the sensor board, for example, a circuit capable of outputting sensor data in response to a request from a control board is provided. The control board is, for example, a microcomputer. For example, an IC (Integrated Circuit) may be provided on the sensor board. The IC may include, for example, an analog-to-digital converter 75a, a capacitance-to-digital converter 75b, or a DC/DC converter 75c.

As shown in FIG. 1, the sensor portion 10 may further include a second mounting board 16b. The first mounting board 16a is provided between the second mounting board 16b and the element board 15. A control circuit may be provided between the second mounting board 16b and the first mounting board 16a. The control circuit includes, for example, at least one of a microcomputer or a wireless communication circuit. In the second mounting board 16b, for example, a circuit capable of controlling the IC provided on the first mounting board 16a can be provided.

As shown in FIG. 1, the first mounting board 16a may be fixed to the first housing member 41 by a structure body 48.

As shown in FIG. 2, for example, the sensor member 12 may be fixed to the support portion 13 via an electrode 13e provided on the support portion 13 and a sensor fixing portion 13c. The sensor fixing portion 13c is, for example, conductive paste.

As shown in FIG. 2, the housing 40 may further include a fourth housing member 44. The outer region 310 is located between the fourth housing member 44 and the first inner face 41f. The outer region 310 is fixed by the fourth housing member 44 and the first inner face 41f. For example, a fixing member 47 may be provided. The fixing member 47 fixes the fourth housing member 44 to the first housing member 41. The fixing member 47 is, for example, a screw.

As shown in FIG. 2, the sensor 110 may further include a first elastic member 46a. The first elastic member 46a is provided between the outer region 310 and the first housing member 41. The outer region 310 is fixed in close contact with the first housing member 41 by the first elastic member 46a. The first elastic member 46a is, for example, annular. The first elastic member 46a may be an O-ring, for example. For example, the first elastic member 46a is of a resin.

The sensor 110 may further include a second elastic member 46b. The second elastic member 46b is provided between the fourth housing member 44 and the outer region 310. The outer region 310 is fixed in close contact with the fourth housing member 44 by the second elastic member 46b. The second elastic member 46b is, for example, annular. The second elastic member 46b may be an O-ring, for example. For example, the second elastic member 46b is of a resin.

In the embodiments, for example, the sensor element 11 may include a capacitive MEMS gas sensor. The sensor element 11 may include a thermal conductivity MEMS gas sensor. The sensor element 11 may include a contact combustion type MEMS gas sensor. The sensor element 11 may include an oxide semiconductor MEMS gas sensor. The sensor element 11 may include at least one of the plurality of gas sensors described above.

Figure 3:
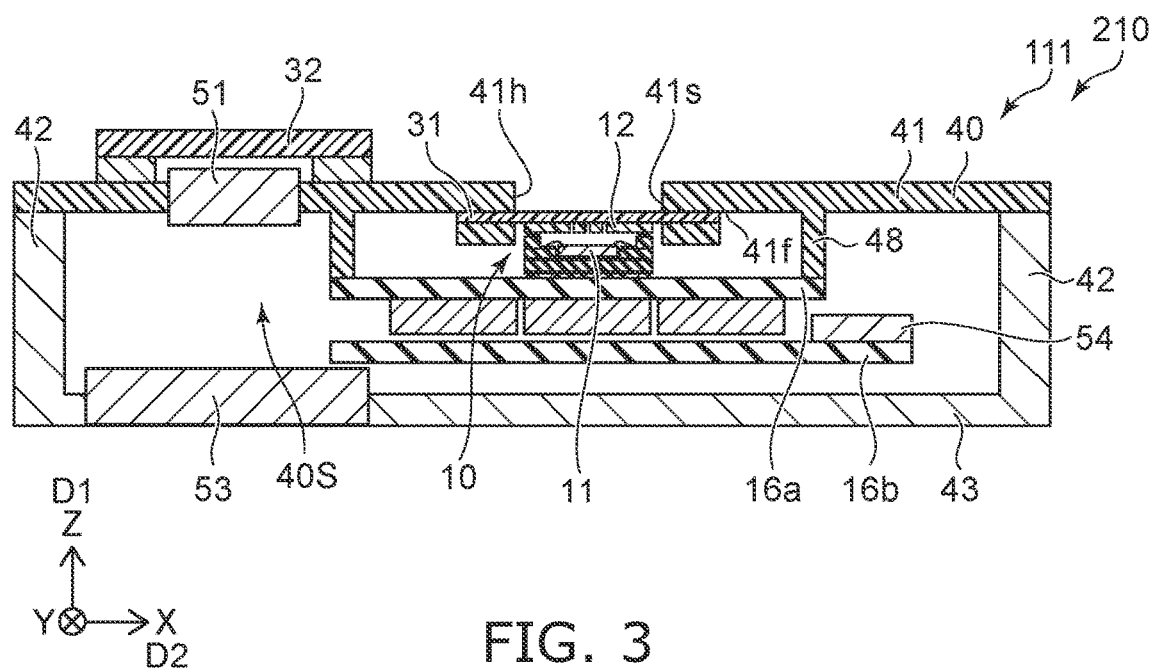
FIG. 3 is a schematic cross-sectional view illustrating a sensor according to the first embodiment.

FIG. 3 is a schematic cross-sectional view illustrating a sensor according to the first embodiment.

As shown in FIG. 3, a sensor 111 according to the embodiment includes a dehumidifier 51. The configuration of the sensor 111 excluding this may be the same as the configuration of the sensor 110. The dehumidifier 51 is configured to dehumidify the space 40S inside the housing 40. For example, the influence of humidity is suppressed, and the detection target gas can be detected with higher sensitivity.

A porous member 32 may be provided between the external space and the dehumidifier 51. It is possible to suppress the liquid from adhering to the dehumidifier 51. The porous member 32 may include, for example, polytetrafluoroethylene. The porous member 32 may be fixed to housing 40 in any manner.

In this example, the sensor 111 includes a battery 53. The battery 53 is configured to supply power to the sensor portion 10.

In this example, a communicator 54 is provided. The communicator 54 is configured to transmit a signal based on a signal obtained from the sensor element 11 to the outside.

Figure 4:
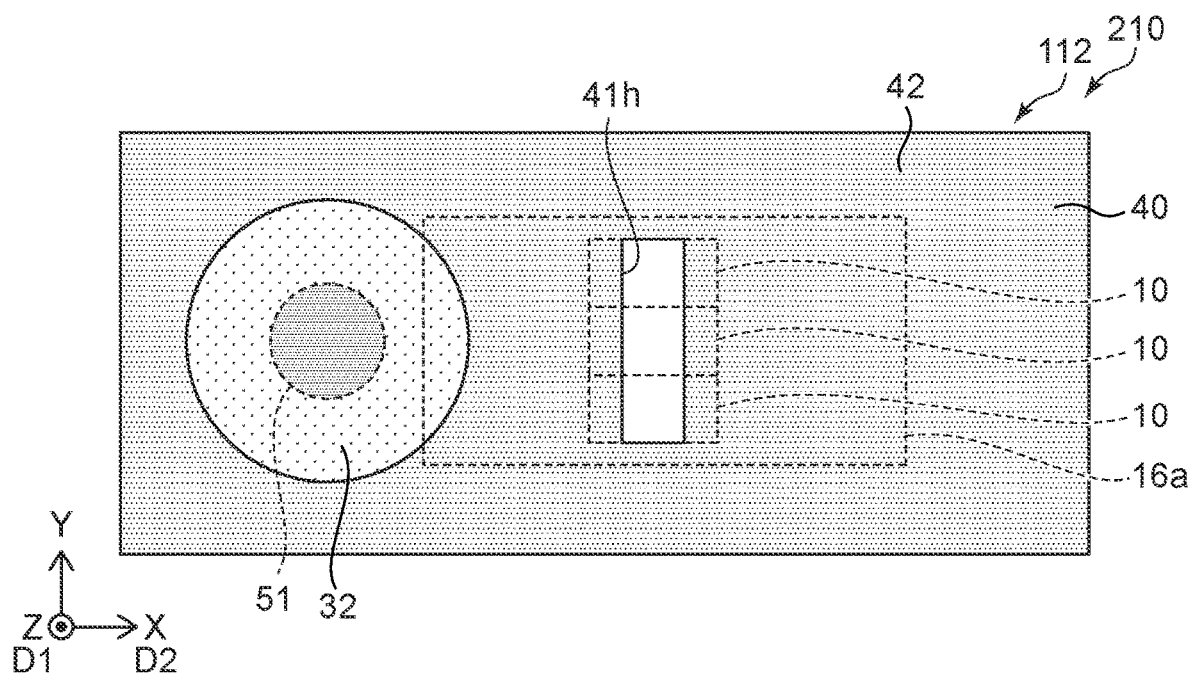
FIG. 4 is a schematic plan view illustrating a sensor according to the first embodiment.

FIG. 4 is a schematic plan view illustrating a sensor according to the first embodiment.

As shown in FIG. 4, a plurality of sensor portions 10 may be provided in a sensor 112 according to the embodiment.

Except for this, the configuration of the sensor 112 may be the same as the configuration of the sensor 110 or the configuration of the sensor 111. At least two of the plurality of sensor portions 10 may have different detection targets. For example, hydrogen may be detected by one of the multiple sensor portions 10 and carbon dioxide gas may be detected by another one of the multiple sensor portions 10.

Second Embodiment

The second embodiment relates to a sensor system. As shown in FIG. 3, a sensor system 210 according to the embodiment includes the sensor according to the embodiment (such as the sensor 110 or the sensor 111) and the communicator 54. The control of the sensor may be performed via the communicator 54.

The embodiments may include the following configurations (for example, technical proposals).

Configuration 1

A sensor, comprising:
a housing including a first housing member, the first housing member including an opening, the first housing member including a first inner face and a first side face inside the opening;
a sensor portion including a sensor member and a sensor element, the sensor member including a hole, a first gap being provided between the sensor element and the sensor member; and
a film member being porous, the film member including an inner region and an outer region being around the inner region, the outer region facing the first inner face, the sensor member being located between the sensor element and the inner region, the sensor member facing the inner region, at least a part of the inner region overlapping the first side face in a second direction crossing a first direction from the sensor element to the sensor member.

Configuration 2

The sensor according to Configuration 1, wherein the at least the part of the inner region faces the first side face.

Configuration 3

The sensor according to Configuration 1 or 2, wherein
the film member includes a first film face and a second film face,
the second film face faces the sensor member,
the first film face faces a space outside the opening, and
at least a part of the first film face is convexly curved.

Configuration 4

The sensor according to any one of Configurations 1 to 3, wherein
the sensor portion further includes an element board,
the sensor element is located between the element board and the sensor member,
the element board includes an element board face facing the sensor element,
the sensor member includes a sensor member face facing the inner region, and
a first distance between the element board face and the first inner face along the first direction is shorter than a sum of a second distance between the element board face and the sensor member face along the first direction and a first thickness of the inner region along the first direction.

Configuration 5

The sensor according to Configuration 4, wherein an absolute value of a difference between the first distance and the sum is not less than 0.001 times and not more than 1 time the first thickness.

Configuration 6

The sensor according to Configuration 5, wherein
the sensor portion further includes a support portion,
the support portion is fixed to the element board,
the support portion is located between the element board and the sensor member, and
the support portion supports the sensor member.

Configuration 7

The sensor according to Configuration 6, wherein
the support portion is provided around the sensor element in a plane crossing the first direction, and
a space surrounded by the element board, the support portion, the sensor member, and the film member is substantially waterproof.

Configuration 8

The sensor according to any one of Configurations 1 to 7, wherein the film member is flexible.

Configuration 9

The sensor according to any one of Configurations 1 to 8, wherein the film member includes a fluorine resin.

Configuration 10

The sensor according to any one of Configurations 1 to 9, wherein the film member includes polytetrafluoroethylene.

Configuration 11

The sensor according to any one of Configurations 1 to 10, wherein a detection target gas is configured to pass through the opening and the hole to reach the first gap.

Configuration 12

The sensor according to Configuration 11, wherein the film member is configured to suppress passage of liquid from the opening to the first gap.

Configuration 13

The sensor according to Configuration 11, wherein the film member is configured to suppress passage of water from the opening to the first gap.

Configuration 14

The sensor according to any one of Configurations 1 to 13, wherein
the housing includes a second housing member and a third housing member,
the sensor portion is located between the third housing member and the first housing member in the first direction,
the second housing member is connected to the first housing member and the third housing member,
the second housing member is provided around the sensor portion in a plane crossing the first direction, and
a space inside the housing is substantially waterproof.

Configuration 15

The sensor according to Configuration 14, further comprising
a dehumidifier,
the dehumidifier being configured to dehumidify the space inside the housing.

Configuration 16

The sensor according to any one of Configurations 1 to 15, further comprising
a first elastic member,
the first elastic member being located between the outer region and the first housing member.

Configuration 17

The sensor according to any one of Configurations 1 to 16, wherein
the housing further includes a fourth housing member,
the outer region is located between the fourth housing member and the first inner face, and
the outer region is fixed by the fourth housing member and the first inner face.

Configuration 18

The sensor according to Configuration 17, further comprising
a second elastic member,
the second elastic member being located between the fourth housing member and the outer region.

Configuration 19

The sensor according to any one of Configurations 1 to 18, wherein the sensor element includes at least one of a capacitive MEMS gas sensor, a thermal conductivity MEMS gas sensor, a contact combustion type MEMS gas sensor, or an oxide semiconductor MEMS gas sensor.

Configuration 20

A sensor system, comprising;
the sensor according to any one of Configurations 1 to 19; and
a communicator,
the communicator being configured to transmit a signal based on a signal obtained from the sensor element to the outside.

According to the embodiments, it is possible to provide a sensor and a sensor system capable of improving detection accuracy.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and sensor systems such as housings, sensor portions, sensor element, film members, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and sensor systems practicable by an appropriate design modification by one skilled in the art based on the sensors and the sensor systems described above as embodiments of the invention also are within the scope of the invention to the extent that the purport of the invention are included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a housing including a first housing member, the first housing member including an opening, the first housing member including a first inner face and a first side face inside the opening;
a sensor portion including a sensor member and a sensor element, the sensor member including a hole, a first gap being provided between the sensor element and the sensor member; and
a film member being porous, the film member including an inner region and an outer region being around the inner region, the outer region facing the first inner face, the sensor member being located between the sensor element and the inner region, the sensor member facing the inner region, at least a part of the inner region overlapping the first side face in a second direction crossing a first direction from the sensor element to the sensor member, such that a line drawn in the second direction intersects both the first side face and the overlapping part of the inner region.

2. The sensor according to claim 1, wherein the at least the part of the inner region faces the first side face.

3. The sensor according to claim 1, wherein
the film member includes a first film face and a second film face,
the second film face faces the sensor member,
the first film face faces a space outside the opening, and
at least a part of the first film face is convexly curved.

4. The sensor according to claim 1, wherein
the sensor portion further includes an element board,
the sensor element is located between the element board and the sensor member,
the element board includes an element board face facing the sensor element,
the sensor member includes a sensor member face facing the inner region, and
a first distance between the element board face and the first inner face along the first direction is shorter than a sum of a second distance between the element board face and the sensor member face along the first direction and a first thickness of the inner region along the first direction.

5. The sensor according to claim 4, wherein an absolute value of a difference between the first distance and the sum is not less than 0.001 times and not more than 1 time the first thickness.

6. The sensor according to claim 5, wherein
the sensor portion further includes a support portion,
the support portion is fixed to the element board,
the support portion is located between the element board and the sensor member, and
the support portion supports the sensor member.

7. The sensor according to claim 6, wherein
the support portion is provided around the sensor element in a plane crossing the first direction, and
a space surrounded by the element board, the support portion, the sensor member, and the film member is substantially waterproof.

8. The sensor according to claim 1, wherein the film member is flexible.

9. The sensor according to claim 1, wherein the film member includes a fluorine resin.

10. The sensor according to claim 1, wherein the film member includes polytetrafluoroethylene.

11. The sensor according to claim 1, wherein a detection target gas is configured to pass through the opening and the hole to reach the first gap.

12. The sensor according to claim 11, wherein the film member is configured to suppress passage of liquid from the opening to the first gap.

13. The sensor according to claim 11, wherein the film member is configured to suppress passage of water from the opening to the first gap.

14. The sensor according to claim 1, wherein
the housing includes a second housing member and a third housing member,
the sensor portion is located between the third housing member and the first housing member in the first direction,
the second housing member is connected to the first housing member and the third housing member,
the second housing member is provided around the sensor portion in a plane crossing the first direction, and
a space inside the housing is substantially waterproof.

15. The sensor according to claim 14, further comprising a dehumidifier,
the dehumidifier being configured to dehumidify the space inside the housing.

16. The sensor according to claim 1, further comprising a first elastic member,
the first elastic member being located between the outer region and the first housing member.

17. The sensor according to claim 1, wherein
the housing further includes a fourth housing member,
the outer region is located between the fourth housing member and the first inner face, and
the outer region is fixed by the fourth housing member and the first inner face.

18. The sensor according to claim 17, further comprising a second elastic member,
the second elastic member being located between the fourth housing member and the outer region.

19. The sensor according to claim 1, wherein the sensor element includes at least one of a capacitive MEMS gas sensor, a thermal conductivity MEMS gas sensor, a contact combustion type MEMS gas sensor, or an oxide semiconductor MEMS gas sensor.

20. A sensor system, comprising;
the sensor according to claim 1; and
a communicator,
the communicator being configured to transmit a signal based on a signal obtained from the sensor element to the outside.

* * * * *